United States Patent [19]

Scelza et al.

[11] Patent Number: 5,787,200
[45] Date of Patent: Jul. 28, 1998

[54] CHARACTER RECOGNITION COPROCESSOR

[75] Inventors: Pasquale Scelza, Genova Sestri Ponente; Giovanni Borghero, Novi Ligure; Fabio Caccia, Genoa; Riccardo Cecinati, Albissola, all of Italy

[73] Assignee: Finmeccanica S.P.A., Rome, Italy

[21] Appl. No.: 537,282

[22] Filed: Sep. 29, 1995

[30] Foreign Application Priority Data

Sep. 30, 1994 [IT] Italy ................... TO94A0774

[51] Int. Cl.[6] ................ G06K 9/64; G06K 9/68; G06K 9/46; G06K 9/66; G06F 15/00
[52] U.S. Cl. .................. 382/217; 382/194; 395/800.31
[58] Field of Search ........................ 382/187, 209, 382/217, 218, 219, 221, 222, 194; 364/132, 131; 395/505, 504, 503, 502

[56] References Cited

U.S. PATENT DOCUMENTS

| | | | |
|---|---|---|---|
| 3,576,534 | 4/1971 | Steinberger | 382/221 |
| 4,376,973 | 3/1983 | Chivers | 395/570 |
| 4,380,698 | 4/1983 | Butts | 219/492 |
| 4,700,292 | 10/1987 | Campanini | 395/200.2 |
| 4,769,851 | 9/1988 | Nishijima et al. | 382/218 |
| 4,975,974 | 12/1990 | Nishijima et al. | 382/218 |
| 4,985,848 | 1/1991 | Pfeiffer et al. | 395/505 |
| 5,321,772 | 6/1994 | Sawyer | 382/216 |
| 5,394,514 | 2/1995 | Matsubara | 395/115 |
| 5,546,538 | 8/1996 | Cobbley et al. | 395/200.01 |

FOREIGN PATENT DOCUMENTS 0 105 438  4/1984  European Pat. Off. .

Primary Examiner—Yon J. Couso
Assistant Examiner—Ha Tran Nguyen
Attorney, Agent, or Firm—Armstrong, Westerman, Hattori, McLeland, & Naughton

[57] ABSTRACT

A SLAVE coprocessor connectable to a MASTER processor and cooperating with at least one external memory. The coprocessor presents an internal memory communicating with an internal data line extending between a first and second interface circuit communicating respectively with the processor and the external memory; the internal memory contains a character composed of a rectangular matrix of pixels corresponding to a digitized alphanumeric character; and the coprocessor presents an electronic arithmetic unit for comparing a character from the internal memory with a reference matrix from the external memory.

10 Claims, 7 Drawing Sheets

Bc n Am

Bm n Ac

EXOR C,M

CHARACTER RECOGNITION COPROCESSOR

BACKGROUND OF THE INVENTION

The present invention relates to a character recognition coprocessor.

SLAVE coprocessors are known which cooperate with and are controlled by a MASTER processor, which enables and programs the coprocessor and reads the data processed by it.

Such coprocessors may cooperate with an external memory containing operating data used by the coprocessor.

SUMMARY OF THE INVENTION

It is an object of the present invention to provide a SLAVE coprocessor of the above type, which may be used to advantage in OCR (Optical Character Recognition) processes.

More specifically, it is an object of the present invention to provide a coprocessor for comparing unknown characters (comprising a rectangular matrix of pixels, the binary value of which corresponds to the stroke/background of a digitized alphanumeric character) with reference masks.

According to the present invention, there is provided a SLAVE character recognition coprocessor connectable to a MASTER processor and cooperating with at least one external memory; characterized in that it comprises:

- first interface and internal decoding means (8) communicating with said processor;
- second interface and internal decoding means (17) communicating with said external memory;
- at least one internal data line extending between said first interface means and said second interface means; and
- at least one internal memory communicating with said internal data line;
  - said internal memory containing at least one character (Cj) comprising a rectangular binary matrix of pixels;
  - each character (Cj) comprising a first type of pixel presenting a first binary value ("1") and corresponding to the stroke of a digitized alphanumeric character, and a second type of pixel presenting a second binary value ("0") and corresponding to the background of the alphanumeric character;
  - said external memory containing a number of reference masks (Mi), each comprising a rectangular binary matrix of pixels;
  - said number of masks defining a class of masks comparable with said character;
  - said coprocessor also comprising an electronic arithmetic unit communicating at the input with said second interface means and with said internal memory;
  - said electronic arithmetic unit communicating at the output with said MASTER processor;
  - said electronic arithmetic unit comparing a character (Cj) with at least one said mask (Mi), and calculating at least one distance (Di) representing the difference between the character (Cj) and the mask (Mi).

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
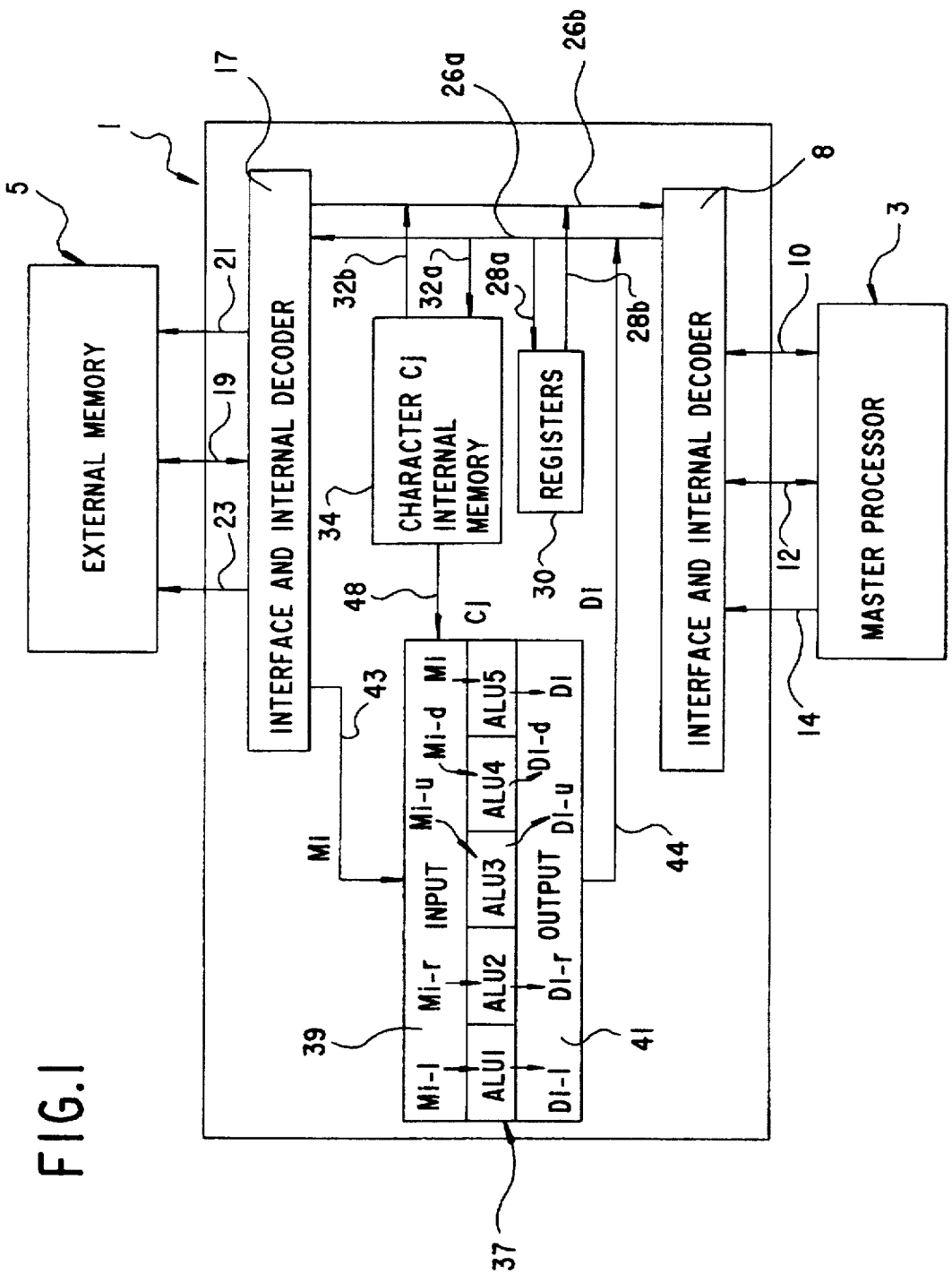
FIG. 1 shows a schematic diagram of a character recognition coprocessor in accordance with the teachings of the present invention.

Number 1 in FIG. 1 indicates a character recognition coprocessor in accordance with the teachings of the present invention.

Coprocessor 1 is a 32-bit SLAVE coprocessor, and cooperates with a known MASTER (or HOST) processor 3 (e.g. an 80386 or 80486 processor), which controls operation of, programs and enables, and reads the data processed by, SLAVE coprocessor 1.

Coprocessor 1 also cooperates with a known external memory 5, in particular, a static 32-bit memory of maximum 2 Megabytes, which may comprise one or more (e.g. two or four) memory banks.

Coprocessor 1 comprises a first interface and internal decoding circuit 8 communicating with processor 3 over a two-way data line (BUS) 10 for transmitting data to and from processor 3.

Interface circuit 8 also communicates with processor 3 over a data line (BUS) 12 for transmitting control signals from processor 3 to coprocessor 1, and with a data line (BUS) 14 for transmitting addresses from processor 3 to coprocessor 1.

Coprocessor 1 also comprises a second interface and internal decoding circuit 17 communicating with external memory 5 over a two-way data line (BUS) 19 for transmitting data to and from memory 5.

Second interface circuit 17 also communicates with memory 5 over a data line (BUS) 21 for transmitting control signals to memory 5, and with a data line (BUS) 23 for transmitting addresses from coprocessor 1 to memory 5.

Coprocessor 1 also comprises a first internal data line (BUS) 26a extending from first interface circuit 8 to second interface circuit 17; and a second internal data line (BUS) 26b extending from second interface circuit 17 to first interface circuit 8.

From internal data lines 26a, 26b, there extend respective data lines 28a, 28b, which communicate with a number of control registers 30 (R1, R2, ... Rn) described later on.

Internal data lines 26a, 26b also communicate respectively with data lines 32a (input), 32b (output), which communicate with a second internal memory 34 containing, as described later on, a binary matrix of pixels defining a character Cj for recognition.

Coprocessor 1 also comprises an arithmetic logic unit (ALU) 37 with input registers 39 and output registers 41 communicating respectively with second interface circuit 17 and first interface circuit 8 over respective data lines 43, 44.

Input registers 39 are also connected to second internal memory 34 over a data line 48.

As described in detail later on, coprocessor 1 provides for PATTERN MATCHING an unknown character Cj and a number of known characters Mi hereinafter referred to as masks.

Characters Cj are formed by digitizing analog images of handwritten or typewritten alphanumeric characters (letter, numbers, punctuation marks), and are defined by rectangular matrixes of pixels which may assume "0" or "1" binary values (binary bitmaps).

More specifically, each character Cj comprises a first set of pixels (of binary value "1") corresponding to the stroke of the character; and a second set of pixels (of binary value "0") corresponding to the background of the digitized character.

In the following description, a character Cj is intended to mean the matrix formed by the first and second set of pixels.

Each character Cj presents a width of 32 bits, and a maximum height of 64 bits, and is therefore defined by a rectangular binary matrix of maximum 32×64 bits.

Masks Mi are also defined by binary matrixes of maximum 32×64 bits.

External memory 5 contains masks Mi; characters Cj are transferred to memory 34 for the comparison to be made; and masks Mi and characters Cj are compared, as described later on, by arithmetic logic unit 37, which supplies a number of numeric values Di, each expressing the distance, according to a given measuring system, between the character Cj being examined and a respective mask Mi, and which are subsequently recovered by processor 3.

The operations performed by coprocessor 1 according to the present invention will now be described with reference to the block diagram in FIG. 2.

The FIG. 2 block diagram shows a preferred example of the operation of coprocessor 1, some of the steps described below being performable differently and/or in a different order from those shown, and some of the steps even being dispensable.

Some of the operations described sequentially may also be performed in parallel.

In the first block 100, a number of registers 30 R of coprocessor 1 are programmed to permit the coprocessor to operate correctly. In particular, block 100 programs an IDWAIT register containing a number of parameters defining:

the identification of coprocessor 1;

the number of wait steps with which to access external memory 5;

the number of memory banks in external memory 5;

the coprocessor 1 access mode (INTERRUPT or POLLING);

format details of the output data of coprocessor 1.

Block 100 also programs an HLIMMM register indicating the maximum size of external memory 5.

Block 100 is followed by block 110 in which masks Mi are loaded into external memory 5. More specifically, the data relative to masks Mi transferred by processor 3 is sent to interface circuit 8, along data line 26a to interface circuit 17, and along data line 19 to memory 5.

Block 110 is followed by block 115 which performs a logic operation j=0 to reset a first variable j.

Block 115 is followed by block 117 in which character Cj is loaded into memory 34 and unit 37. More specifically, the data relative to character Cj transferred by processor 3 is sent to interface circuit 8 and along data line 26a and data line 32a to memory 34.

Block 117 also programs a HIGH_CRT register containing the height HC (expressed in 32-bit words) of the character Cj being examined, which height HC, as already stated, ranges from 1 to 64.

Block 117 is followed by block 118 which performs a logic operation i=0 to reset a second variable i.

Block 118 is followed by block 120 which programs a STIMM register indicating the pointer value of the mask from which the comparison is to commence.

Block 120 also programs a COMMAND register containing a number of parameters defining:

the maximum number NUMMSK of masks to be compared with character Cj (the maximum number of masks NUMMSK to be compared with a character normally corresponds to a class of masks);

enabling/disabling of the mask centering function (described later on).

Block 120 is followed by block 130 which waits for a START control register to be enabled. When it is (START=1), block 130 goes on to block 135 which loads a first mask Mi into input unit 39 of arithmetic logic unit 37, to do which, the data of mask Mi is sent from external memory 5 along line 19 to circuit 17, and along line 43 to unit 37. Block 130 may be simultaneous with block 120.

Block 135 is followed by block 140 (described in detail later on) which, if mask Mi and the character Cj in memory 34 differ in height, provides for centering mask Mi to adapt its height HM to that of the character.

Block 140 is followed by block 145 which, by examining the COMMAND register, determines whether centering of mask Mi has been requested. If it has, block 145 goes on simultaneously to five blocks 150, 151, 152, 153, 154. If it has not, block 145 only goes on to block 154.

If centering has been requested, blocks 150, 151, 152, 153, 154 are followed by block 160; if centering has not been requested, block 154 is followed by block 170.

Block 160 is also followed by block 170.

Block 154 compares character Cj with the mask Mi loaded in block 135, by means of an algorithm Hplus (described in detail later on) which supplies at the output a distance Di representing a measurement of the difference between character Cj and reference mask Mi according to the equation:

$$Di = Hplus(Cj, Mi) \qquad [1]$$

Distance Di decreases alongside an increase in the "resemblance" of character Cj and mask Mi.

Blocks 150, 151, 152, 153 respectively provide for effecting four shifts (left, right, up, down) of mask Mi (referred to as the central mask), and for calculating respective masks Mi-l (LEFT-SHIFT), Mi-r (RIGHT-SHIFT), Mi-u (UP-SHIFT) and Mi-d (DOWN-SHIFT).

Since mask Mi is defined by a rectangular matrix of pixels, masks Mi-l, Mi-r, Mi-u, Mi-d are respectively generated by shifting all the significant pixels of central mask Mi by one pixel towards the left, right, top and bottom edge of the rectangular matrix respectively. FIGS. 6a–6e respectively show a central mask Mi, a left-shift mask Mi-l, a right-shift mask Mi-r, an up-shift mask Mi-u, and a down-shift mask Mi-d relative, in the example, shown to the number "8".

By means of the Hplus algorithm [1], blocks 150, 151, 152, 153 respectively provide for comparing character Cj, loaded into unit 37, with masks Mi-l (LEFT-SHIFT), Mi-r (RIGHT-SHIFT), Mi-u (UP-SHIFT) and Mi-d (DOWN-SHIFT).

The operations in blocks 150, 151, 152, 153 and 154 are performed in parallel by separate arithmetic circuits ALU1, ALU2, ALU3, ALU4, ALU5 (FIG. 1) of arithmetic logic unit 37.

Each circuit ALU1, ALU2, ALU3, ALU4, ALU5 is therefore supplied with a set of pixels respectively defining mask Mi-l (LEFT-SHIFT), Mi-r (RIGHT-SHIFT), Mi-u (UP-SHIFT), Mi-d (DOWN-SHIFT) and central mask Mi.

Each circuit ALU1, ALU2, ALU3, ALU4 and ALU5 therefore supplies a distance Di-l (LEFT-SHIFT), Di-r (RIGHT-SHIFT), Di-u (UP-SHIFT), Di-d (DOWN-SHIFT) and Di indicating the "distance" between the mask at the input and character Cj.

From all the distance values Di-l, Di-r, Di-u, Di-d and Di calculated by blocks 150, 151, 152, 153 and 154, block 160 selects the minimum value (Dimin-shift), which, of central mask Mi and its shifts, corresponds to the mask most closely resembling character Cj, and which is memorized in a buffer memory.

In the event the same distance is calculated in blocks 150-154, block 160 selects the winning mask with the following order of precedence:

1) central mask Mi;
2) right-shift mask Mi-r;
3) left-shift mask Mi-l;
4) up-shift mask Mi-u;
5) down-shift mask Mi-d.

From the Di values calculated successively in block 154 and the Dimin-shift values calculated in block 160 (if centering is requested), block 170 selects the minimum value (Dimin-abs), which corresponds to a mask Mi-max ("winning" mask) most closely resembling character Cj. That is, of all the masks in the class, and of all the shifts made of them, mask Mi-max is the one most closely "resembling" character Cj. More specifically, of the newly calculated and previously calculated winning masks, block 170 selects the lesser of the two, and repetition of the above operations for an entire class of masks provides for determining mask Mi-max.

In the event two successive masks present the same distance, the value calculated first is selected.

Block 170 provides for programming a WINADRR register, by loading the address of the winning mask Mi-max, the, minimum distance value Dimin, and the winning mask code (central, right-shift, left-shift, up-shift, down-shift).

Block 170 is followed by block 175 which determines whether all the masks NUMMSK in the class have been compared with character Cj.

If they have, block 175 goes on to block 180; if they have not, block 175 goes on to block 176 which increases variable i by one unit (i=i+1) to select the next mask in memory 5, and then goes back to block 135 which loads another mask Mi+1 into unit 37.

In block 180, the Dimin-abs value and the address of the winning mask Mi-max are read by processor 3.

Block 180 is followed by block 185 which determines whether all the classes for comparison have been compared with character Cj.

If they have, block 185 goes on to block 190; if they have not, block 185 goes back to block 118.

Block 190 determines whether any more characters are to be recognized. In the event of a negative response, block 190 goes on to end block 191; in the event of a positive response, block 190 goes on to block 192 which increases character variable j by one unit (j=j+1) to request another character for recognition.

Block 192 goes back to block 117 which provides for loading another character Cj+1 into unit 37.

Figure 3:
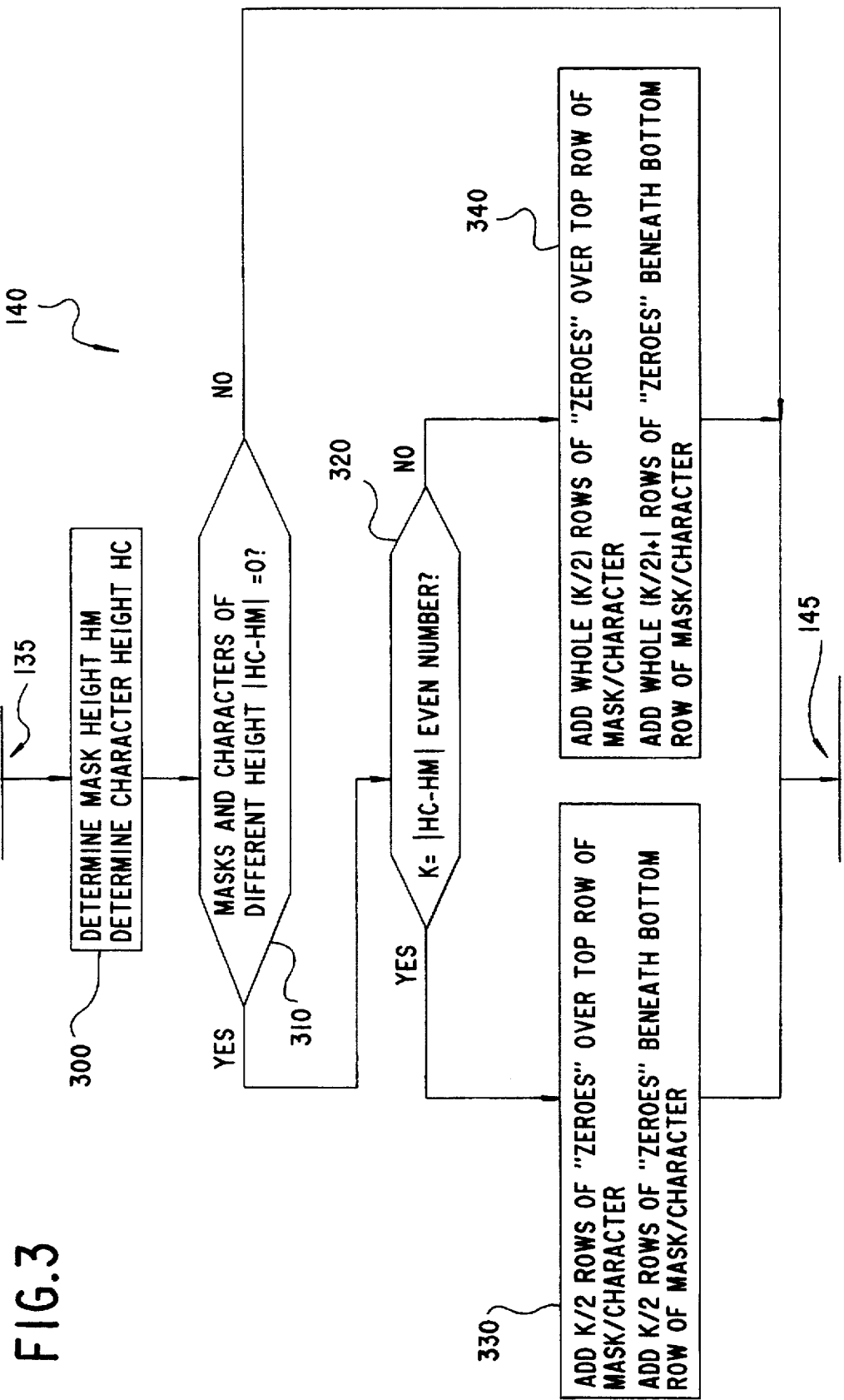
FIG. 3 shows a detail of a first block in FIG. 2.
Figure 4:
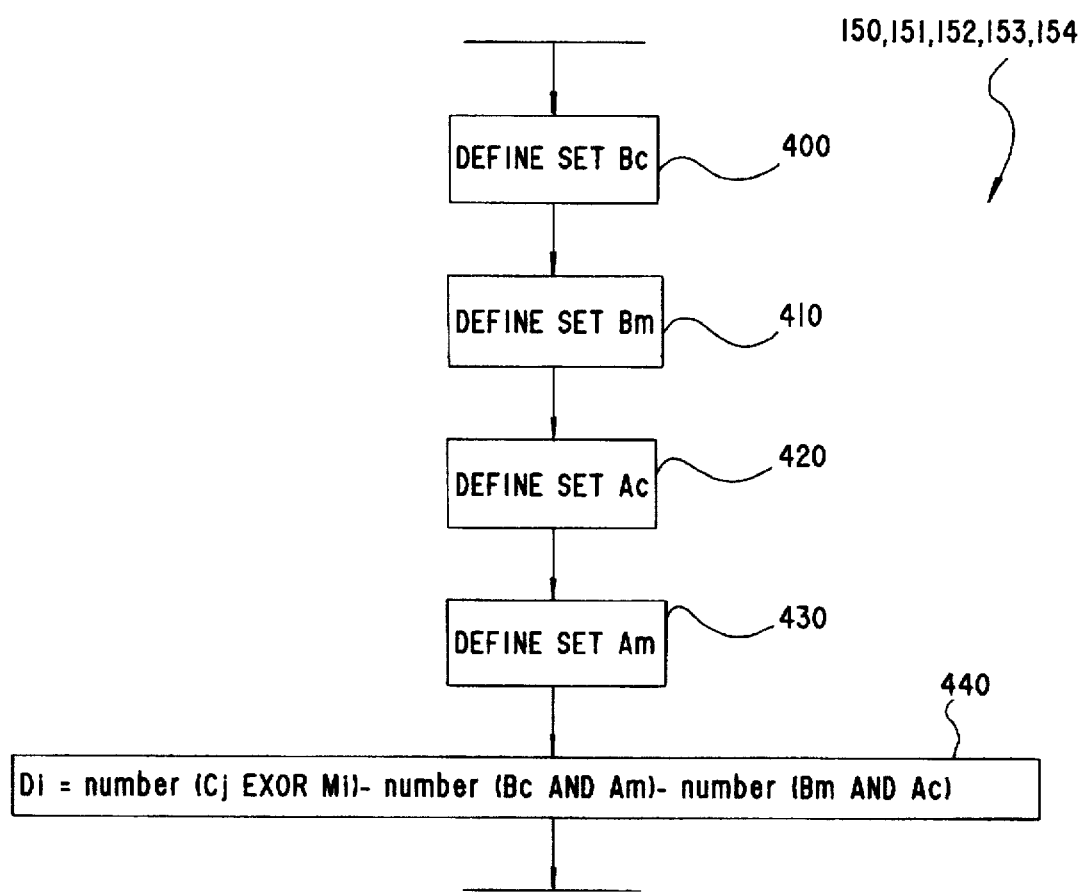
FIG. 4 shows a detail of a second block in FIG. 2.

FIG. 3 shows a detail of block 140 for centering mask Mi in relation to character Cj.

More specifically, block 140 comprises a first block 300 for determining the height HC of character Cj and the height HM of the mask Mi currently being used.

Block 300 is followed by block 310 which calculates the absolute value of the difference between the height HC of the character and the height HM of the mask according to the equation:

$$K = \text{ABSOLUTE VALUE (HC−HM)} \qquad [2]$$

where K is a whole number.

Figure 2:
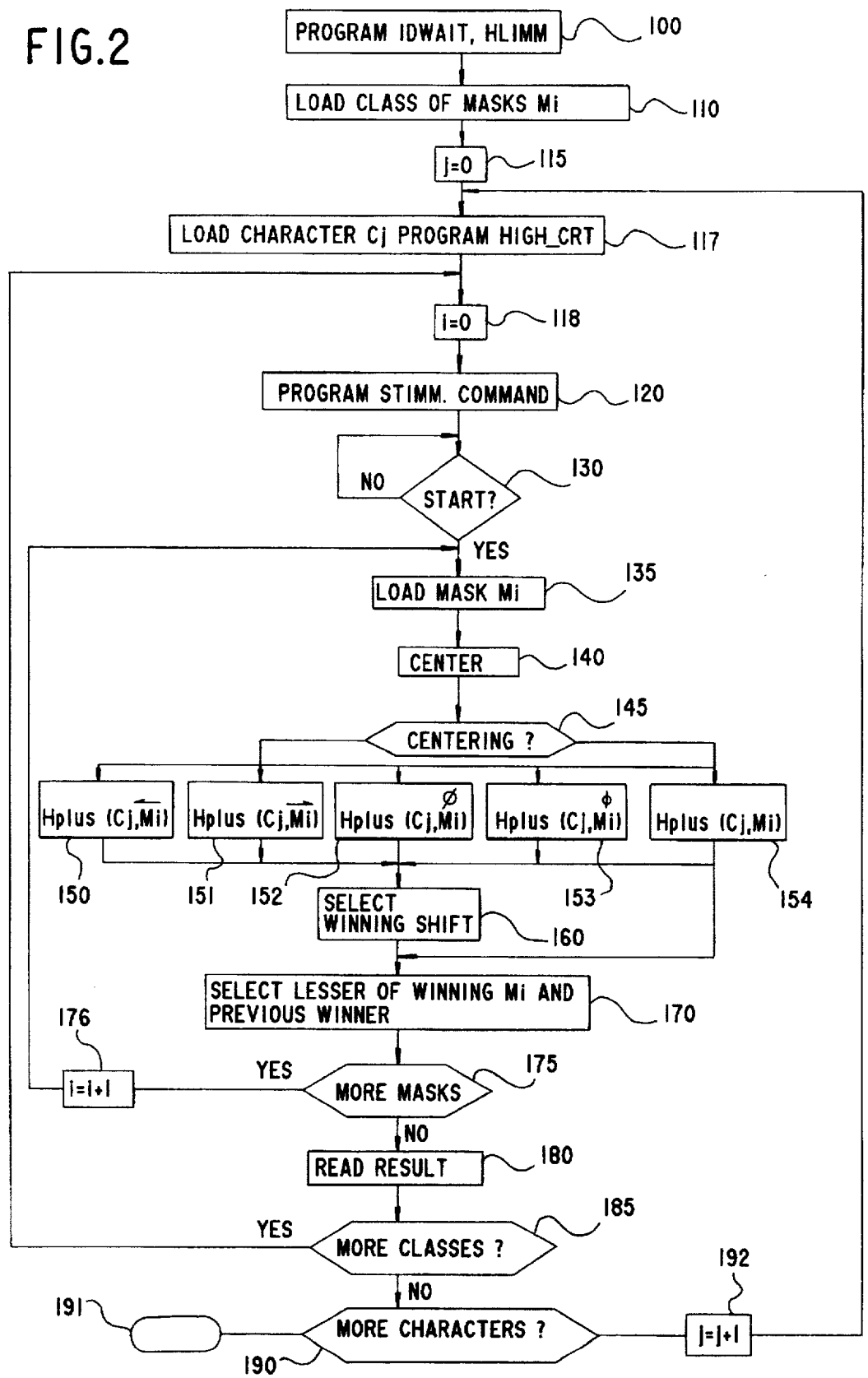
FIG. 2 shows a logic block diagram of the operations performed by the FIG. 1 coprocessor.

If difference K is other than zero (i.e. if the mask and the character are of different height), block 310 goes on to block 320; conversely (i.e. if the mask and the character are the same height), block 310 goes on to block 145 (FIGS. 2 and 3).

Block 320 determines whether whole number K is an even number, and, if it is, goes on to block 330; conversely (K an odd number), block 320 goes on to block 340.

In the event height HM of the mask is less than height HC of the character, block 330 adds K/2 rows of zero pixels over the top row of mask Mi, and K/2 rows of zero pixels beneath the bottom row of mask Mi to which is added a total of K rows of zeroes, so that the modified mask Mi presents the same height as character Cj. In the event the height HC of the character is less than the height HM of the mask, block 330 adds K/2 rows of zero pixels over the top row of character Cj, and K/2 rows of zero pixels beneath the bottom row of character Cj to which is added a total of K rows of zeroes, so that the modified character Cj presents the same height as mask Mi.

In the event height HM of the mask is less than height HC of the character, block 340 adds WHOLE(K/2) rows of zero pixels over the top row of mask Mi, and WHOLE(K/2)+1 rows of zero pixels beneath the bottom row of mask Mi to which is added a total of K rows of zeroes, so that the modified mask Mi presents the same height as character Cj.

In the event the height HC of the character is less than the height HM of the mask, block 340 adds WHOLE(K/2) rows of zero pixels over the top row of character Cj, and WHOLE(K/2)+1 rows of zero pixels beneath the bottom row of character Cj to which is added a total of K rows of zeroes, so that the modified character Cj presents the same height as mask Mi.

Blocks 330, 340 go on to block 145 (FIGS. 2 and 3).

For example, if HC=10 and HM=7, K=3 (odd number), in which case, block 340 adds WHOLE(3/2)=1 row of zeroes over the top row of mask Mi, and WHOLE(3/2)+1=2 rows of zeroes beneath the bottom row of mask Mi to which is added a total of 3 rows of zeroes.

FIGS. 4 and 5a–5i show the operations performed by blocks 150–154 to compare mask Mi and character Cj.

For the sake of simplicity, in the following description, the mask will be indicated by the letter M and the character by the letter C.

Blocks 150–154 comprise a first block 400 which defines a first set of pixels Bc defined by the pixels p in character C conforming with the following requirements:

p=1 (p is a "1" pixel); and p is adjacent to at least one "0" pixel in character C.

The above pixels define the inner contour (FIG. 5c) of the set of "1" pixels in the alphanumeric character represented in matrix C.

Block 400 is followed by block 410 which defines a second set of pixels Bm defined by the pixels p in mask M conforming with the following requirements:

p=1 (p is a "1" pixel); and p is adjacent to at least one "0" pixel in mask M.

The above pixels define the inner contour (FIG. 5d) of the set of pixels corresponding to the stroke of the digitized alphanumeric character.

Block 410 is followed by block 420 which defines a third set of pixels Ac defined by the pixels p in character C conforming with the following requirements:

p=0 (p is a "0" pixel); and p is adjacent to at least one "1" pixel in character C.

The above pixels define a contour (FIG. 5e) outside the set of "1" pixels of the alphanumeric character represented in matrix C.

Block 420 is followed by block 430 which defines a fourth set of pixels Am defined by the pixels p in mask M conforming with the following requirements:

p=0 (p is a "0" pixel); and p is adjacent to at least one "1" pixel in mask M.

The above pixels define a contour (FIG. 5f) outside the set of "1" pixels of the alphanumeric character represented in mask M.

Block 430 is followed by block 440 which calculates distance D according to the equation:

$$D = \text{Num.}(C \text{ EXOR } M) - \text{Num.}(Bc \text{ AND } Am) - \text{Num.}(Bm \text{ AND } Ac) \quad [3]$$

where Bc, Bm, Ac, Am are the sets of pixels defined by blocks 400, 410, 420, 430; AND and EXOR are the intersection and exclusive OR Boolean logical operators; and Num. is the logic "1" bit count function.

Figure 5A:
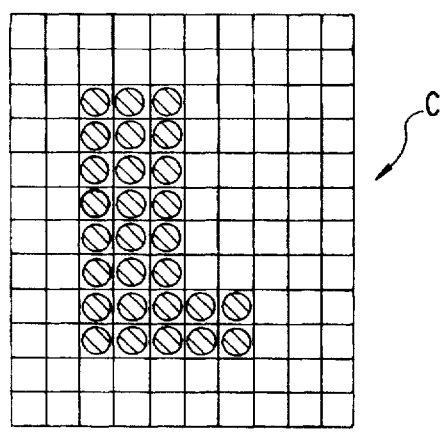
FIGS. 5a–5i and 6a–6e show, graphically, a number of operations performed by the coprocessor according to the present invention.
Figure 5B:
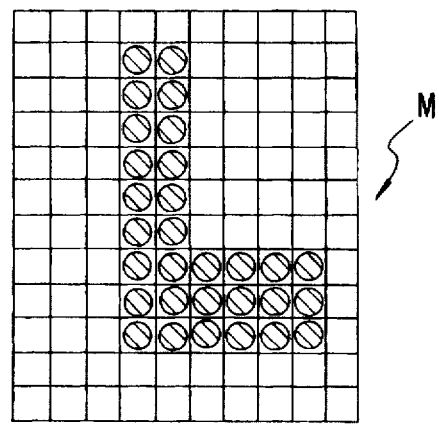
Figure 5C:
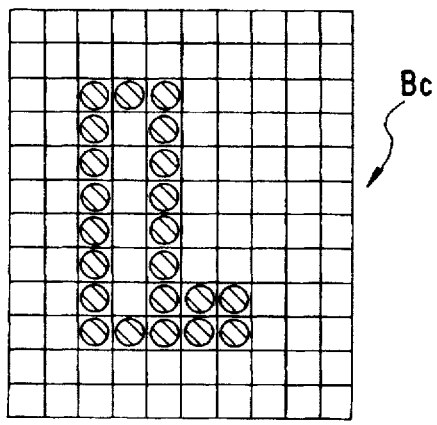
Figure 5D:
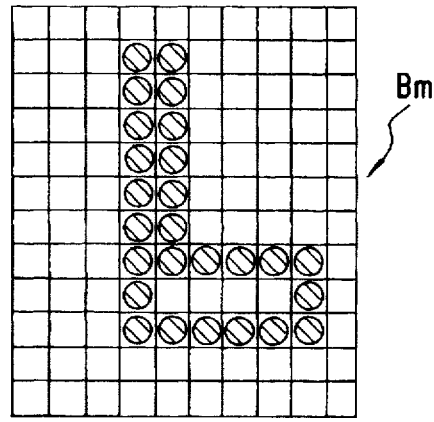
Figure 5E:
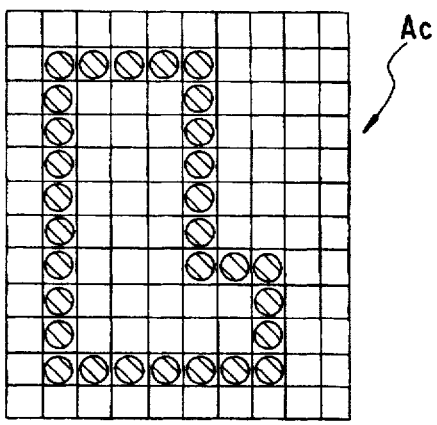
Figure 5F:
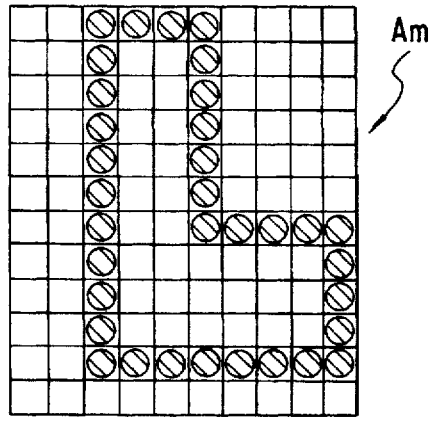
Figure 5G:
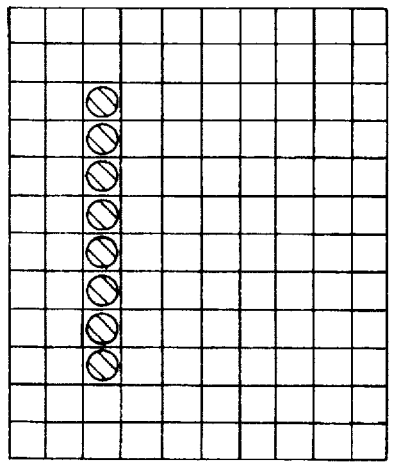
Figure 5H:
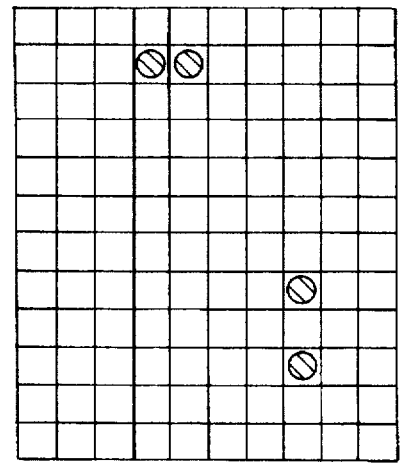
Figure 5I:
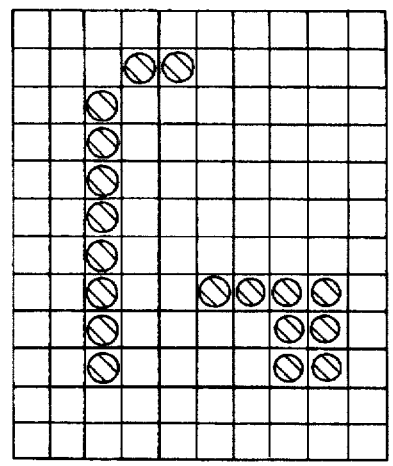
Figure 6A:
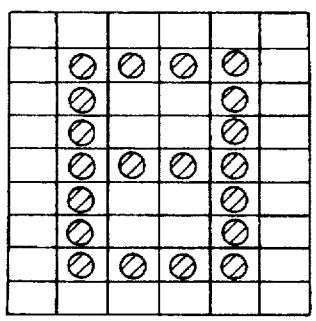
Figure 6B:
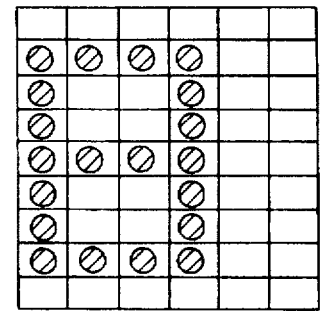
Figure 6C:
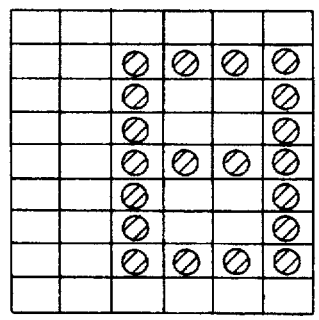
Figure 6D:
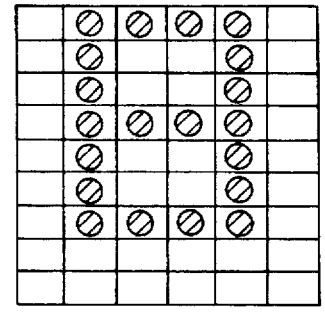
Figure 6E:
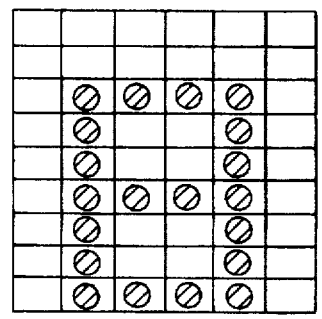

FIGS. 5a–5i show the operations performed by blocks 150–154:

Figure 5a shows the set of pixels corresponding to a character Cj (in this case, the letter L) for recognition;

FIG. 5b shows the set of pixels corresponding to a reference mask Mi (in this case, the letter L);

FIG. 5c shows the set of pixels Bc;

FIG. 5d shows the set of pixels Bm;

FIG. 5e shows the set of pixels Ac;

FIG. 5f shows the set of pixels Am;

FIG. 5g shows the intersection (AND) of pixel sets Bc and Am (in this case, formed of 8 pixels);

FIG. 5h shows the intersection (AND) of pixel sets Bm and Ac (in this case, formed of 4 pixels);

FIG. 5i shows the EXOR of mask M and character Cj (in this case, formed of 18 pixels).

When [3] is applied to the above example:

$$D = 18 - 8 - 4 = 6.$$

The present version of coprocessor 1 presents a maximum operating speed of 33 MHz, and is housed in a 160-pin PQFP surface-mounted container.

Coprocessor 1 therefore provides for rapidly comparing an unknown character Cj with one or more classes of masks Mi to determine the mask most closely resembling character Cj, and is capable of processing hundreds of characters a second, depending on the number of masks compared, the clock, and the type of MASTER processor employed.

The algorithm [3] used in unit 37 is extremely effective, and provides for enhancing recognition capacity and greatly reducing the error factor of known systems.

The centering operation performed by block 145 provides for improving the character recognition rate.

Parallel operation of blocks 150–154 provides for increasing processing speed.

The centering operation performed by block 140 provides for comparing characters and masks of different height.

Coprocessor 1 may also operate with memories of different sizes and access times, by virtue of the characteristic parameters of the memory being adjustable by means of the IDWAIT register.

The coprocessor is extremely cheap to produce.

And finally, coprocessor 1 may also be used in modular structures featuring a variable number of coprocessors operating in parallel and controlled by a single MASTER processor. In which case, the coprocessors may share a single external memory containing the same class of masks, or each coprocessor may be provided with a respective external memory containing a respective class of masks.

Clearly, changes may be made to the coprocessor as described and illustrated herein without, however, departing from the scope of the present invention.

We claim:

1. A SLAVE character recognition coprecessor connectable to a MASTER processor and cooperating with at least one external memory, said coprocessor comprising:

first interface and internal decoding means communicating with said processor;

second interface and internal decoding means communicating with said external memory;

at least one internal data line extending between said first interface means and said second interface means;

at least one internal memory communicating with said internal data line; and an electronic arithmetic unit communicating at an input with said second interface means and with said internal memory, and communicating at an output with said MASTER processor;

said internal memory having at least one character comprising a rectangular binary matrix of pixels;

each character comprising a first type of pixel presenting a first binary value ("1") and corresponding to the stroke of a digitized alphanumeric character, and a second type of pixel presenting a second binary value ("0") and corresponding to the background of the alphanumeric character;

said external memory containing a number of reference masks, each comprising a rectangular binary matrix of pixels;

said number of masks defining a class of masks comparable with said character;

said electronic arithmetic unit comparing a character with at least one said masks, and calculating at least one distance representing the difference between the character and the mask.

2. A coprocessor as claimed in claim 1, wherein said electronic arithmetic unit comprises:

first electronic computing means for defining a first set of pixels comprising the pixels in the character wherein each pixel of said first set of the pixels is a pixel of the first type of the character and is adjacent to at least one pixel of the second type of the character;

second electronic computing means for defining a second set of pixels comprising pixels in the mask wherein each pixel of said second set of the pixels is a pixel of the first type of the mask; and is adjacent to at least one pixel of the second type of the mask;

third electronic computing means for defining a third set of pixels comprising the pixels in the character wherein each pixel of said third set of pixels is a pixel of the second type of the character and is adjacent to at least one pixel of the first type of the character;

fourth electronic computing means for defining a fourth set of pixels comprising the pixels in the mask wherein each pixel of said fourth set of pixels is a pixel of the second type of the mask and is adjacent to at least one pixel of the first type of the mask; and fifth electronic means for calculating said distance according to an equation of the type: D=Num. (C EXOR M)

−Num. (Bc AND Am) −Num. (Bm AND Ac) where C and M represent said character and said mask; Bc, Bm, Ac, Am are said first, second, third and fourth sets of pixels respectively; AND and EXOR are the intersection and exclusive OR Boolean logical operators; and Num. is the first-type pixel count function.

3. A coprocessor as claimed in claim 1, further comprising centering means for comparing a dimension value of said character with a corresponding dimension value of said mask, and for adapting said dimension of said mask with said dimension of said character.

4. A coprocessor as claimed in claim 3, wherein said centering means comprise:

- means for determining the height of the character and the height of the mask in use in said electronic arithmetic unit;
- first comparing means for determining the absolute value K of the difference between said height of the character and said height of the mask;
- second comparing means selected by said first comparing means if said absolute value K is other than zero, and which determines whether said absolute value K is an even number;
- first correcting means selected by said second comparing means, for correcting an even said absolute value K, and which provides for adding K/2 rows of pixels of the second type over the top row of the mask in use, and K/2 rows of pixels of the second type beneath the bottom row of the mask in use when the height the mask is less than the height of the character;
- said first correcting means adding K/2 rows of pixels of the second type over the top row of the character in use, and K/2 rows of pixels of the second type beneath the bottom row of the character in use when the height of the character is less than the height of the mask;
- second correcting means selected by said second comparing means, for correcting an odd said absolute value K, and which provides for adding WHOLE (K/2) rows of pixels of the second type over the top row of the mask in use, and WHOLE (K/2)+1 rows of pixels of the second type beneath the bottom row of the mask in use when the height of the mask is less than the height of the character;
- said second correcting means adding WHOLE (K/2) rows of pixels of the second type over the top row of the character in use, and WHOLE (K/2)+1 rows of pixels of the second type beneath the bottom row of the character in use when the height of the character is less than the height of the mask.

5. A coprocessor as claimed in claim 2, further comprising:

- centering means for perpendicularly shifting the mask supplied to said arithmetic unit, and generating respective left-shift, right-shift, up-shift and down-shift masks;
- first, second, third and fourth arithmetic circuits respectively supplied with said left-shift, right-shift, up-shift and down-shift masks, and generating, by means of said equation, respective intermediate left-shift, right-shift, up-shift and down-shift distances;
- a fifth arithmetic circuit supplied with said mask and generating, by means of said equation, an intermediate centered distance; and
- selecting means supplied with said intermediate distances computed by said first, third, fourth and fifth arithmetic circuits for computing said distance by selecting the lesser of said intermediate distances.

6. A coprocessor as claimed in claim 5, wherein said first, second, third, fourth and fifth arithmetic circuits operate in parallel.

7. A coprocessor as claimed in claim 1, further comprising first electronic initializing means for initializing a number of parameters defining:

- an identification of said coprocessor;
- a number of wait steps of the external memory;
- a number of memory banks in the external memory;
- a coprocessor access mode; and
- a coprocessor output data format.

8. A coprocessor as claimed in claim 1, further comprising second electronic initializing means for selecting parameters indicating a size of said external memory.

9. A coprocessor as claimed in claim 1, further comprising third electronic initializing means for initializing a number of parameters defining:

- a maximum number of masks to be compared with the character;
- a type of algorithm used for performing the comparison; and
- a start address of the external memory.

10. A SLAVE character recognition coprocessor connectable to a MASTER processor and cooperating with at least one external memory for comparing at least one character having a rectangular binary matrix of pixels, with a number of reference masks each having a rectangular binary matrix of pixels, and calculating at least one distance representing the difference between the character and the mask, each character having a first type of pixel presenting a first binary value and corresponding to the stroke of a digitized alphanumeric character, and a second type of pixel presenting a second binary value and corresponding to the background of the alphanumeric character; said number of masks defining a class of masks comparable with said character, said coprocesor comprising:

- first electronic computing means for defining a first set of pixels comprising the pixels in the character wherein each pixel of said first set of the pixels is a pixel of the first type of the character and is adjacent to at least one pixel of the second type of the character;
- second electronic computing means for defining a second set of pixels comprising pixels in the mask wherein each pixel of said second set of the pixels is a pixel of the first type of the mask and is adjacent to at least one pixel of the second type of the mask;
- third electronic computing means for defining a third set of pixels comprising the pixels in the character wherein each pixel of said third set of pixels is a pixel of the second type of the character and is adjacent to at least one pixel of the first type of the character;
- fourth electronic computing means for defining a fourth set of pixels comprising the pixels in the mask wherein each pixel of said fourth set of pixels is a pixel of the second type of the mask and is adjacent to at least one pixel of the first type of the mask; and
- fifth electronic means for calculating said distance according to an equation of the type: D=Num. (C EXOR M)−Num. (Bc AND Am)−Num. (Bm AND Ac) where C and M represent said character and said mask; Bc, Bm, Ac, Am are said first, second, third and fourth sets of pixels respectively; AND and EXOR are the intersection and exclusive OR Boolean logical operators; and Num. is the first-type pixel count function.

* * * * *